US006842895B2

(12) United States Patent
Renard et al.

(10) Patent No.: US 6,842,895 B2
(45) Date of Patent: Jan. 11, 2005

(54) SINGLE INSTRUCTION FOR MULTIPLE LOOPS

(75) Inventors: Pascal L. Renard, Annemasse (FR); Joseph P. Gergen, Manchaca, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 614 days.

(21) Appl. No.: 09/746,978

(22) Filed: Dec. 21, 2000

(65) Prior Publication Data

US 2002/0083305 A1 Jun. 27, 2002

(51) Int. Cl.[7] .................................................. G06F 9/45
(52) U.S. Cl. ...................... 717/160; 717/119; 717/150; 712/22
(58) Field of Search .......................... 717/119, 131–133, 717/149–161, 114; 712/10–24, 204–213, 220–221, 226–248

(56) References Cited

U.S. PATENT DOCUMENTS

| | | | | |
|---|---|---|---|---|
| 6,003,128 A | * | 12/1999 | Tran | 712/241 |
| 6,055,627 A | * | 4/2000 | Kyushima et al. | 712/233 |
| 6,085,315 A | * | 7/2000 | Fleck et al. | 712/241 |

OTHER PUBLICATIONS

Hensley et al, "Active Page Architectures for Media Processing", First Workshop on Media Processors and DSPs, 32nd Annual Symposium on Microarchitecture, http://citeseer.nj.nec.com/hensley99a, pp.: 1–10, Nov. 1999.*
Warter et al, "Enhanced Modulo Scheduling for Loops with Conditional branches", MICRO–25 Conference Proceedings, pp.: 1–10, Dec. 1992.*
Albert et al., "Data Parallel Computers and the FORALL Statements", IEEE, pp.: 390–396, 1990.*
Stoodley et al., "Software Pipelining Loops With Conditional Branches", IEEE, pp.: 262–273, 1996.*

* cited by examiner

Primary Examiner—Tuan Dam
Assistant Examiner—Ted T. Vo
(74) Attorney, Agent, or Firm—Joanna G. Chiu

(57) ABSTRACT

Embodiments of the present invention relate generally to the manner in which processors execute multiple loop instructions. That is, embodiments of the invention relate to the organization of multiple loop constructs, such as, for example, nested loops, to achieve improved performance during loop execution. One embodiment contemplates a single instruction that provides for execution of other instructions of a set of instructions in accordance with multiple looping constructs. Another embodiment contemplates a single-loop instruction suitable for terminating on multiple termination conditions.

21 Claims, 6 Drawing Sheets

NESTED LOOPING INSTRUCTION:

```
       T1 = TERMINATION FIELD 1 - CONDITION TO
104            TERMINATE FIRST (INNERMOST) LOOP
       T2 = TERMINATION FIELD 2 - CONDITION TO
                TERMINATE SECOND LOOP
             ⋮
       Tn = TERMINATION FIELD n - CONDITION TO
                TERMINATE nTH (OUTERMOST) LOOP

106    EL1 = END OF LOOP 1 - IDENTIFIES LAST INSTR IN 1ST LOOP
       EL2 = END OF LOOP 2 - IDENTIFIES LAST INSTR IN 2ND LOOP
       ELn = END OF LOOP n - IDENTIFIES LAST INSTR IN nTH LOOP
```

| EXAMPLES OF CONDITION CODE TYPES |||
|---|---|---|
| ID | ENCODING | DECRIPTION |
| CC | 000 | CARRY BIT CLEAR |
| CS | 001 | CARRY BIT SET |
| EQ | 010 | EQUAL |
| NE | 011 | NOT EQUAL |
| GE | 100 | GREATER THAN OR EQUAL |
| GT | 101 | GREATER THAN |
| LE | 110 | LESS THAN OR EQUAL |
| LT | 111 | LESS THAN |

SINGLE LOOP WITH MULTIPLE TERMINATION CONDITIONS

700 → NESTDO EQ, #4, LBL    (702, 704)

⎡ ASL A
⎢ MPY X0, Y0, A
⎣ CMP #74, A

LBL

SINGLE INSTRUCTION FOR MULTIPLE LOOPS

FIELD OF THE INVENTION

The present invention relates to the field of digital processors and more particularly to the manner in which processors execute multiple loop instructions.

RELATED ART

Software programs written for execution on digital processors typically accomplish repetitive tasks by including a sequence of instructions within a loop. Because of their repetitive nature, it is highly desirable to optimize the execution of software loops. This is particularly true when multiple loops are utilized, such as when one loop is nested within another loop. Unfortunately, conventional processors typically lack adequate resources to optimize the execution of multiple and nested loop routines. Instead, nested loops are resolved by placing a loop instruction for the inner loop within a sequence of instructions comprising the outer loop. The placement of a loop-type instruction in a repetitive section of code is highly undesirable because the loop-type instructions are relatively complex instructions typically requiring multiple cycles to execute. Therefore, it is highly desirable to implement a processor capable of efficiently executing nested and other multiple loop routines.

BRIEF DESCRIPTION OF THE DRAWINGS

The present invention is illustrated by way of example and not limitation in the accompanying figures, in which like references indicate similar elements, and in which:

FIG. 4 illustrates additional detail of the condition code select field in the looping control unit of the processor of FIG. 3;

FIG. 7 illustrates a single loop, multiple termination condition instruction according to an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Embodiments of the present invention are concerned with the execution of hardware loops in a processor such as a digital signal processor (DSP), microcontroller, or embedded controller. Processors such as these frequently utilize loops to repeatedly execute a common set of instructions. Because of the frequency with which such loops are encountered, it is highly desirable to fully optimize the manner in which the loops are executed. In many cases, loops are nested within one another to achieve a specific function. When loops are nested, inefficiencies in the inner loop are magnified because each instruction in the inner loop is executed repeatedly. Embodiments of the present invention contemplate optimization of multiple loop constructs such as nested loops (and other types of loops) to achieve optimal performance during loop execution. In addition, one embodiment of the invention contemplates a single-loop instruction suitable for terminating on multiple termination conditions to provide greater flexibility to the programmer.

Figure 1:
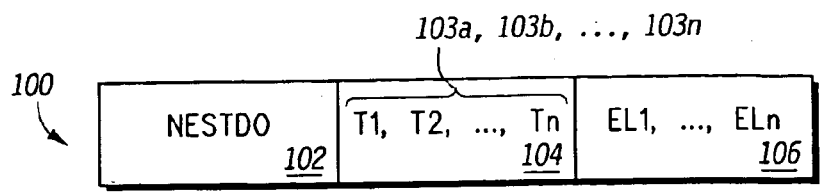
FIG. 1 is a diagram of a nested do loop instruction according to one embodiment of the invention.

Turning now to FIG. 1, a nested do loop instruction 100 according to one embodiment of the invention is presented. Instruction 100 enables the execution of other instructions according to a multiple loop construct. The depicted embodiment of nested do loop instruction 100 includes an operation code (opcode) field 102, a termination field 104, and an end-of-loop address field 106. Opcode field 102, as its name implies, contains the opcode for instruction 100. The termination field 104 includes a set of fields 103a, 103b, . . . 103n each indicating one or more termination conditions (identified in FIG. 1 as termination conditions T1, T2, . . . , Tn). End-of-loop address field 106 includes a set of end-of-loop addresses EL1, . . . ELn. In one embodiment, each termination condition in termination field 104 corresponds to an end-of-loop address in field 106. In one embodiment, termination condition T1 in termination field 104 identifies the condition that will terminate the first (inner most) execution loop of the nested loop construct while termination condition T2 identifies the condition that will terminate the second execution loop, and so forth. Instruction 100 may also be used to enable execution of a single loop having one or more termination conditions.

In one embodiment, each termination condition T1–Tn may comprise a condition code such as, for example, not equal to (NE), greater than or equal to (GE), less than (LT), etc. Condition code termination conditions provide a mechanism to terminate a corresponding loop upon satisfaction of the specified condition. In one embodiment, the last instruction of each loop is responsible for setting one or more flags in a status register. The flags are then used to then determine whether the specified termination condition has been satisfied. Alternatively to condition code type termination conditions, embodiments of the invention permit the use of immediate values as termination conditions. If an immediate value is used as a termination condition, the condition is satisfied when a loop corresponding to the immediate value has been executed the number of times specified by the immediate value. Thus, for example, the first termination condition T1 may be a condition code such as GE or LT while second termination condition T2 may be an immediate value. In this example, the first or inner most loop is executed until the condition code T1 is satisfied while the second loop is executed the number of times specified by the immediate value T2.

As depicted in FIG. 1, instruction 100 may comprise one or more termination conditions in termination field 104 and one or more corresponding end-of-loop addresses in end-of-loop address field 106. The end-of-loop addresses EL1 through ELn indicate the addresses at which the termination conditions in termination field 104 are checked to determine if the specified condition has been satisfied. In one embodiment each termination condition corresponds to an end-of-loop address. In this embodiment, for example, first termination condition T1 in termination field 104 is checked when the program counter is equal to EL1. While a one-to-one correspondence between termination conditions and termination field 104 and end-of-loop addresses and end-of-loop field 106 provides the maximum flexibility for programming multiple loop constructs, embodiments of the invention contemplate that instruction 100 may include fewer than "n" termination conditions in termination field 104 or fewer than "n" end-of-loop addresses in end-of-loop field 106. In one embodiment, for example, a single termination condition T1 in termination field 104 may be utilized for each of the nested loops contemplated by the instruction. Alternatively, each of the nested loops may include a common end-of-loop address EL1 such that end-of-loop address field 106 includes only a single value while each loop corresponds to its own termination condition in termination field 104.

Figure 2:
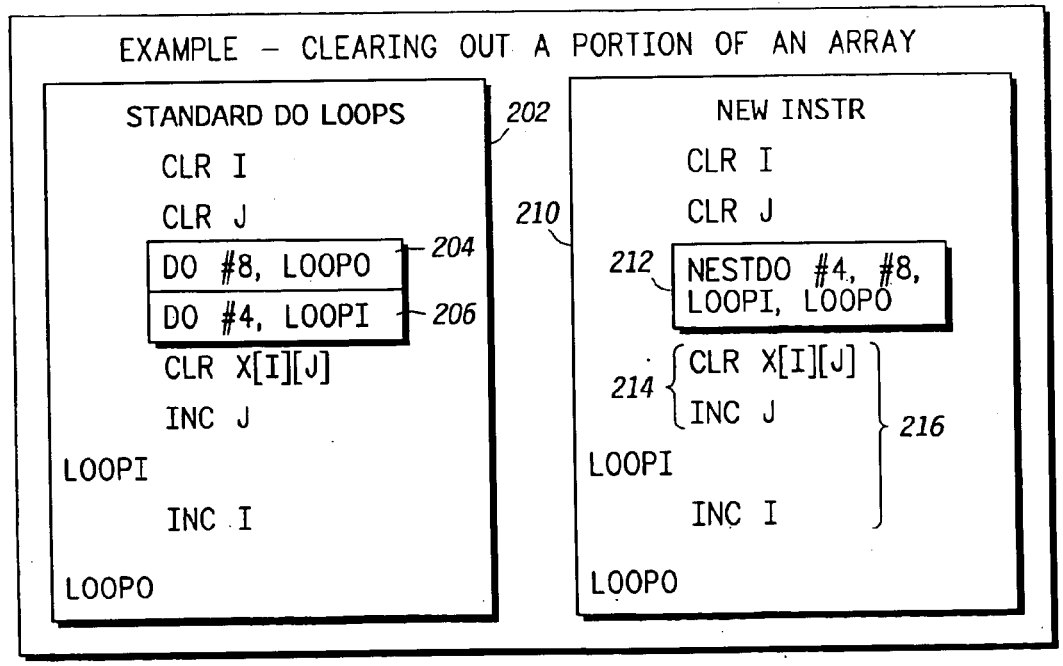
FIG. 2 is an illustrated comparison between a nested do loop according to the prior art and a nested do loop according to an embodiment of the present invention.

Turning now to FIG. 2, the benefits achieved by implementing a single instruction for implementing nested loops is illustrated by comparison between a conventional code segment 202 and an exemplary code segment 210 both used to clear a portion of a two dimensional array X. In conventional code segment 202, a first loop statement 204 and a second loop statement 206 are required to define the nested loops used to clear the two dimensional array. It will be appreciated by those familiar with microprocessor execution that second loop statement 206 may represent a multiple-cycle operation. Because multiple-cycle operations limit system performance, it is highly desirable to minimize the number of times each multiple-cycle operation is executed, especially in code segments that execute repeatedly. In the example depicted in FIG. 2, however, second loop statement 206 is executed for each iteration of the outer loop corresponding to first loop instruction 204. In the depicted example, which is suitable for clearing an 8×4 two-dimensional array, loop instruction 206 is executed 8 times, once for each execution of the loop defined by first loop statement 204. Roughly speaking, the loop statements of first and second loop instructions 204 and 206 executes in approximately five cycles while the remaining instructions execute in a single cycle. Thus, it will be appreciated that the multiple loop instruction construct characteristic of conventional nested loop implementations results in the repetitive execution of complex, multi-cycle processor instructions, thereby potentially limiting system performance.

In contrast to code segment 202, code segment 210, according to an embodiment of the present invention, implements a nested loop instruction 212 (as an example of instruction 100 depicted in FIG. 1) which results in improved performance by eliminating the repetitive execution of complex, multi-cycle instructions. In the depicted example, the immediate values #4 and #8 correspond to the first and second termination conditions T1 and T2 of first and second fields 103a and 103b of termination field 104 indicted in FIG. 1 while LoopI and LoopO correspond to EL1 and EL2 in end-of-loop field 106. By eliminating the overhead associated with the second do statement 206 of code segment 202 from the nested loop in code segment 210, code segment 210 performs the same function as the code segment 202 while offering a potentially significant improvement in execution time. In the depicted embodiment, the inner loop 214 defined by nested do loop instruction 212 includes only relatively simple, single-cycle instruction. Thus, by enabling a multiple loop construction with a single loop statement, the embodiment illustrated in FIG. 2 succeeds in removing multiple cycle instructions from repetitively executed routines. While nested do statement 212 in the depicted embodiment utilizes a termination field 104 and end-of-loop field 106 both with a depth of two, it will be appreciated that these depths may be increased to achieve third and additional corresponding loops. In addition, while the depicted embodiment of instruction 212 utilizes a pair of immediate fields for the termination conditions, one or both of the termination conditions may utilize a condition code such as NE, LT, or GE. Note also that the inner loop may share a common starting or ending address with the outer loop, while in alternate embodiments, the inner loop might have different starting and ending addresses than the outer loop.

Figure 3:
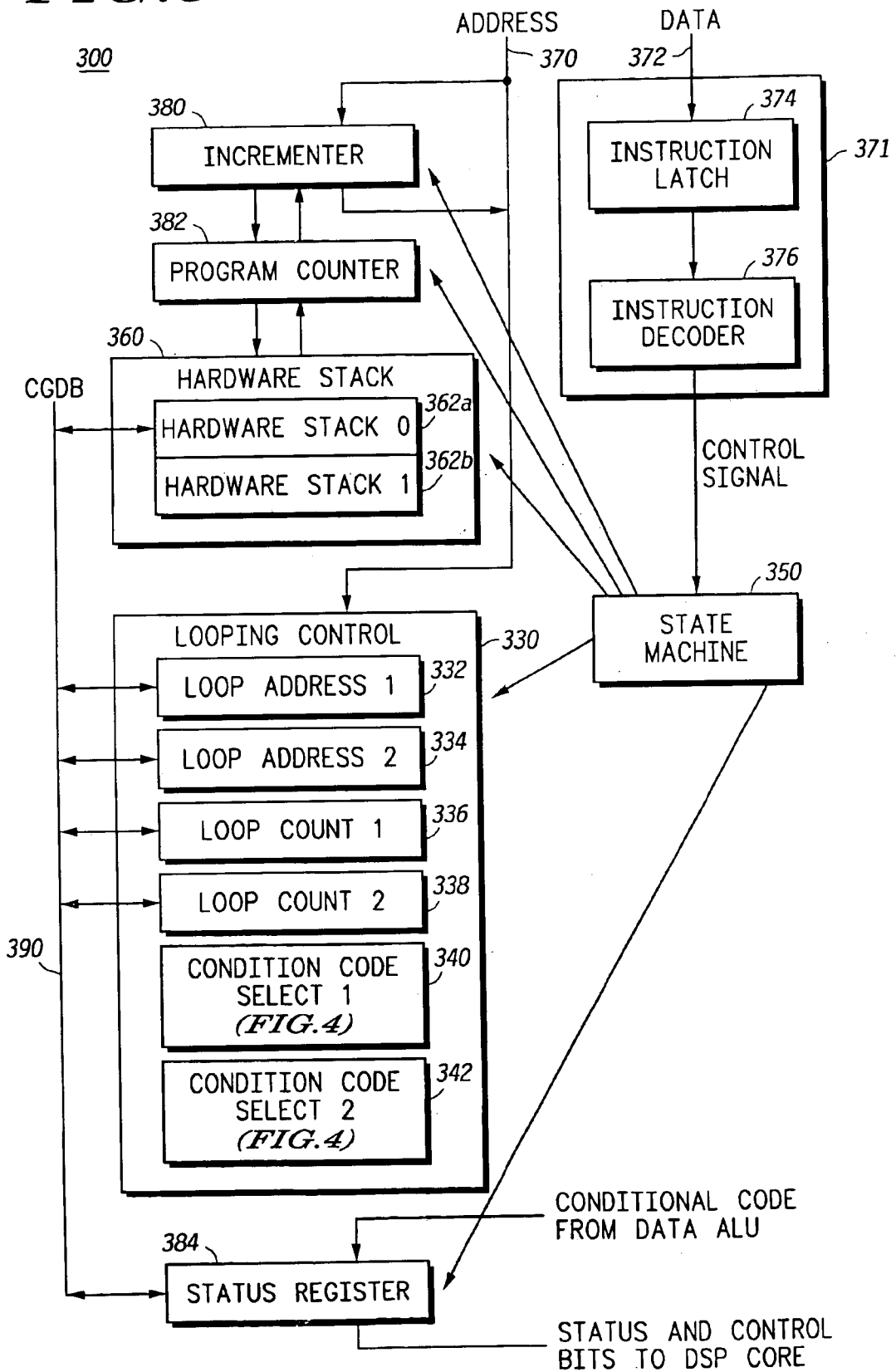
FIG. 3 is a simplified block diagram of a processor suitable for executing a nested do loop instruction according to an embodiment of the invention.

Turning now to FIG. 3, a simplified block diagram of selected components of a processor 300 suitable for executing instructions 100 and 212 as discussed previously with respect to FIGS. 1 and 2 is presented. Processor 300 is suitable for executing a single instruction, such as instruction 100, that provides for the execution of other instructions in accordance with a multiple loop construct. Processor 300 includes an instruction fetching mechanism 371 that retrieves a set of instructions for execution by an execution unit represented in FIG. 3 by state machine 350. Processor 300 is configured to receive information via an address bus 370 and a data bus 372. Data bus 372 conveys computer instructions to an instruction latch 374. Latched instructions are then provided to an instruction decoder 376 where the instructions are decoded and forwarded to state machine 350 for execution. Address bus 370 is provided to an incrementer 380 and a looping control 330.

Looping control unit 330 is utilized in conjunction with state machine 350 to control the flow of an executing code segment. The depicted embodiment of looping control unit 330 includes a pair of loop address registers 332 and 334, a pair of loop count registers 336 and 338, and a pair of condition code select registers 340 and 342. By providing facilities for a loop count and a condition code corresponding to each loop address, looping control unit 330 supports immediate type loop operations as well as conditional loop operations. When, for example, the instruction with the address value stored in loop address 1 register 332 is encountered in the flow of the executing program segment, a decision of whether to branch back to the beginning of the loop may depend on the value stored in loop count register 336 or the value stored in condition code 340 (as well as the then current value of the appropriate status register bit) or both. In the depicted embodiment, hardware stack 360 is utilized to provide a set of hardware stack registers HWS0 362a and HWS1 362b (collectively or generically referred to herein as hardware stack register(s) 362) that contain branch address information for the corresponding loops. Condition code select registers 340 and 342 are stored with a particular value depending upon the type of condition code that will be evaluated when the appropriate end-of-loop address is encountered during program execution. Hardware stack 0 362a, hardware stack 1 362b, loop address 1 register 332, loop address 2 register 334, loop count 1 register 336, loop count 2 register 338, and status register 384 are all bidirectionally coupled to core global data bus (CGDB) 390. CGDB 390 may be a data bus internal to a processor, such as processor 300.

Turning to FIG. 4, an exemplary table 400 illustrating suitable condition code types for storing in condition code select registers 340 and 342 is presented. In the depicted embodiment, table 400 includes a set of eight condition codes and a 3-bit encoding field for uniquely identifying each of the eight condition codes. As will be familiar to those skilled in the field of microprocessor programming, the exemplary condition codes presented in table 400 include familiar condition codes such as equal (EQ), not equal (NE), great than or equal (GE), greater than (GT), less than or equal (LE), less than (LT), carry bit clear (CC), and carry bit set (CS) each with its own corresponding encoding. By storing the appropriate encoding in condition code select registers 340 and 342, the appropriate condition code type is associated with the corresponding loop in the program code. If, for example, condition code select register 340 is programmed with a 011 value, the condition code evaluated when loop address 1 (as stored in loop address 1 register 332) is encountered is the not equal (NE) condition. Assuming that the inner most loop is a conditional loop (rather than an immediate type loop), the NE bit in status register 384 is evaluated when loop address 1 (as stored in loop address 1 register 332) is encountered. Depending on the value of the NE bit, the program will either branch to the beginning of the nested loop (as specified in the hardware stack registers 362a) or exit the loop by incrementing the program count to the next address. Similarly for the remaining encodings, by storing the appropriate value in the condition code select registers 340 and 342, any of the condition codes specifying indicated in condition code table 400 may be utilized in conjunction with controlling the program execution flow.

Figure 5:
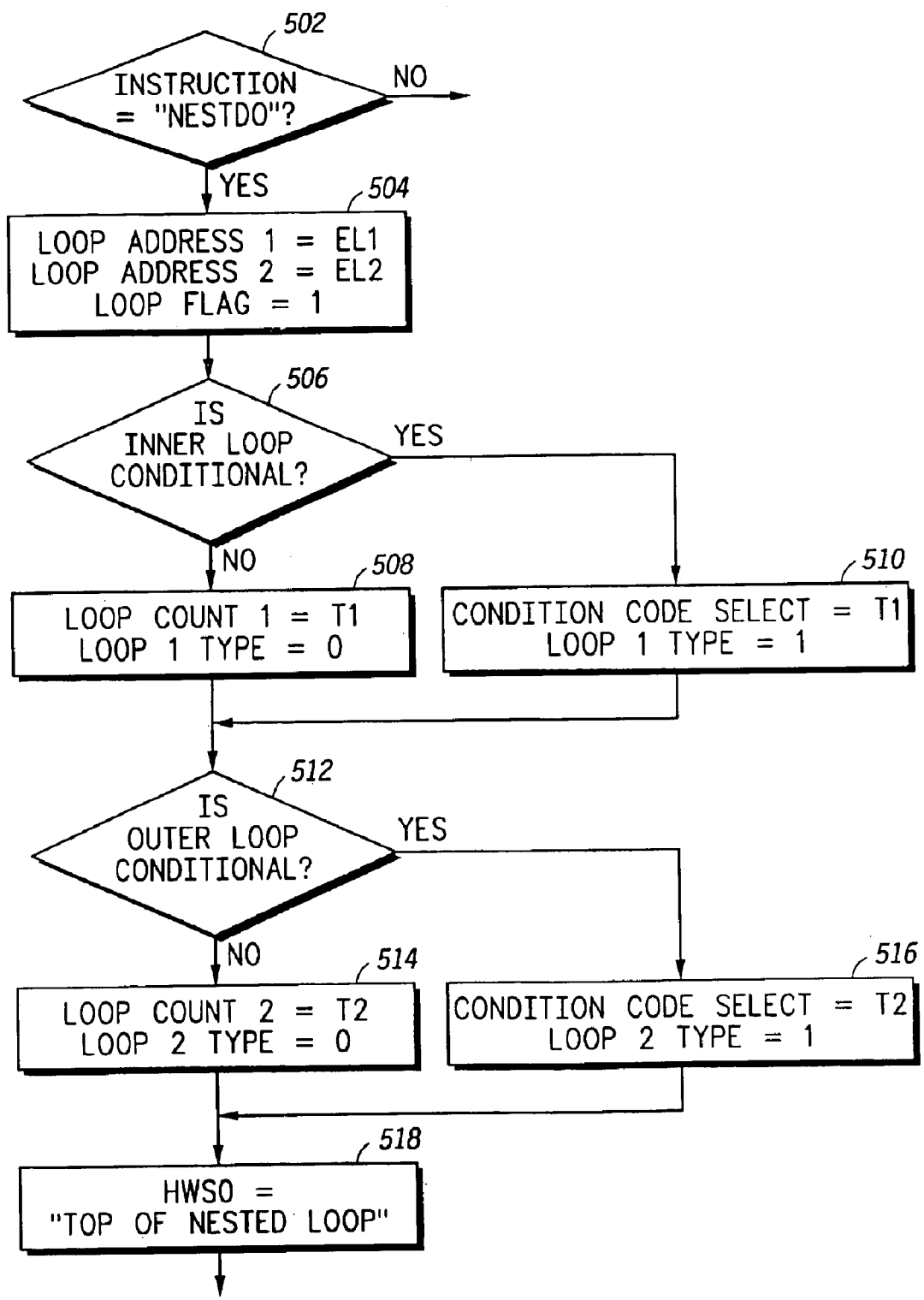
FIG. 5 is a flow diagram illustrating execution of a nested do loop statement according to an embodiment of the invention.

Turning now to FIG. 5, a flow diagram is presented to illustrate one embodiment of the manner in which a multiple loop instruction 100 (described previously with respect to FIGS. 1 and 2) is executed. Initially, an instruction is fetched from memory and provided to an instruction decoder. If instruction decoder 376 of processor 300 as depicted in FIG. 3 detects that the instruction is a nested do loop instruction in step 502 processor 300 initializes a plurality of loops for subsequent execution. More specifically, a set of loop address registers (or other dedicated storage elements) in looping control unit 330 are initialized according to the end-of-loop addresses specified in the nested do loop instruction.

In the depicted example, loop address 1 register 332 is programmed with the value EL1 representing the address corresponding to the end of the inner most loop while loop address 2 register 334 is programmed with EL2 corresponding to the address of the next outer most loop (which, in this case, is the outer most loop). In this manner, each of a set of dedicated loop storage elements corresponding to a set of execution loops is executed using a single instruction. While the depicted example of looping control unit 330 depicts facilities sufficient for specifying first and second loops, it will be appreciated that additional facilities may be suitably implemented to execute nested loops.

Thus, state machine 350 contemplates the initialization of multiple loop addresses and includes facilities for initializing more than one set of loop registers in response to detecting a single instruction such as instruction 100. In addition to the setting of the multiple loop address registers, a loop flag in status register 384 is set in the depicted embodiment of step 504 to provide an interruptible decision point during the execution or processing of the loops. After initialization of the loop address registers in step 504, the depicted embodiment of state machine 350 determines whether the inner most loop is conditional in step 506.

As indicated previously, embodiments of the invention contemplate supporting multiple loop type options. A nonconditional loop type may be conditioned upon an immediate value while a conditional loop type may be conditioned upon a condition code. The immediate value in a nonconditional loop type may be stored as a register value to provide additional flexibility in situations where an immediate value is desirable but the content of the immediate value is not known at compile time. If state machine 350 determines that the inner loop is not conditional in step 506, loop count 1 register 336 is initialized with the T1 value taken from termination field 104 of the nested do loop operation 100 and a loop 1 type flag is set to zero to indicate that the inner most loop is based upon an immediate value rather than a condition code. If state machine 350 determines that inner most loop is conditional in step 506, the condition code select register 340 is programmed with the value stored in termination condition T1 of termination field 104 and the loop 1 type flag is set to 1.

Steps 512, 514, and 516, perform a function analogous to the functions performed by steps 506, 508, and 510 for the second (or, in this case, outer most) loop. Step 512 determines whether the outer most loop is conditional while steps 514 and 516 set appropriate values of the loop count or condition code select registers depending upon whether the outer most loop is conditional. In addition, a loop 2 type flag is set to indicate whether the outer most loop is conditional or immediate. In the described manner, state machine 350 performs a first logical operation corresponding to a first execution loop and a second logical corresponding to a second execution loop. In step 518, state machine 350 sets the value of hardware stack register zero 362a to the address of the top of the nested loop operation to provide a mechanism by which the program counter may be restored to the top of the nested loop.

In one embodiment, loop address 1 register 332 and loop address 2 register 334 may be programmed with a common value to implement a condition in which the inner most and outer most loops utilize a common last instruction or end address. Similarly, the hardware stack register 360 utilizes multiple hardware stack registers 362a, 362b, . . . to indicate the beginning address of each corresponding loop. Thus, by programming hardware stack registers 362 to unique or common values, the multiple loops can have corresponding unique or common starting addresses.

Figure 6:
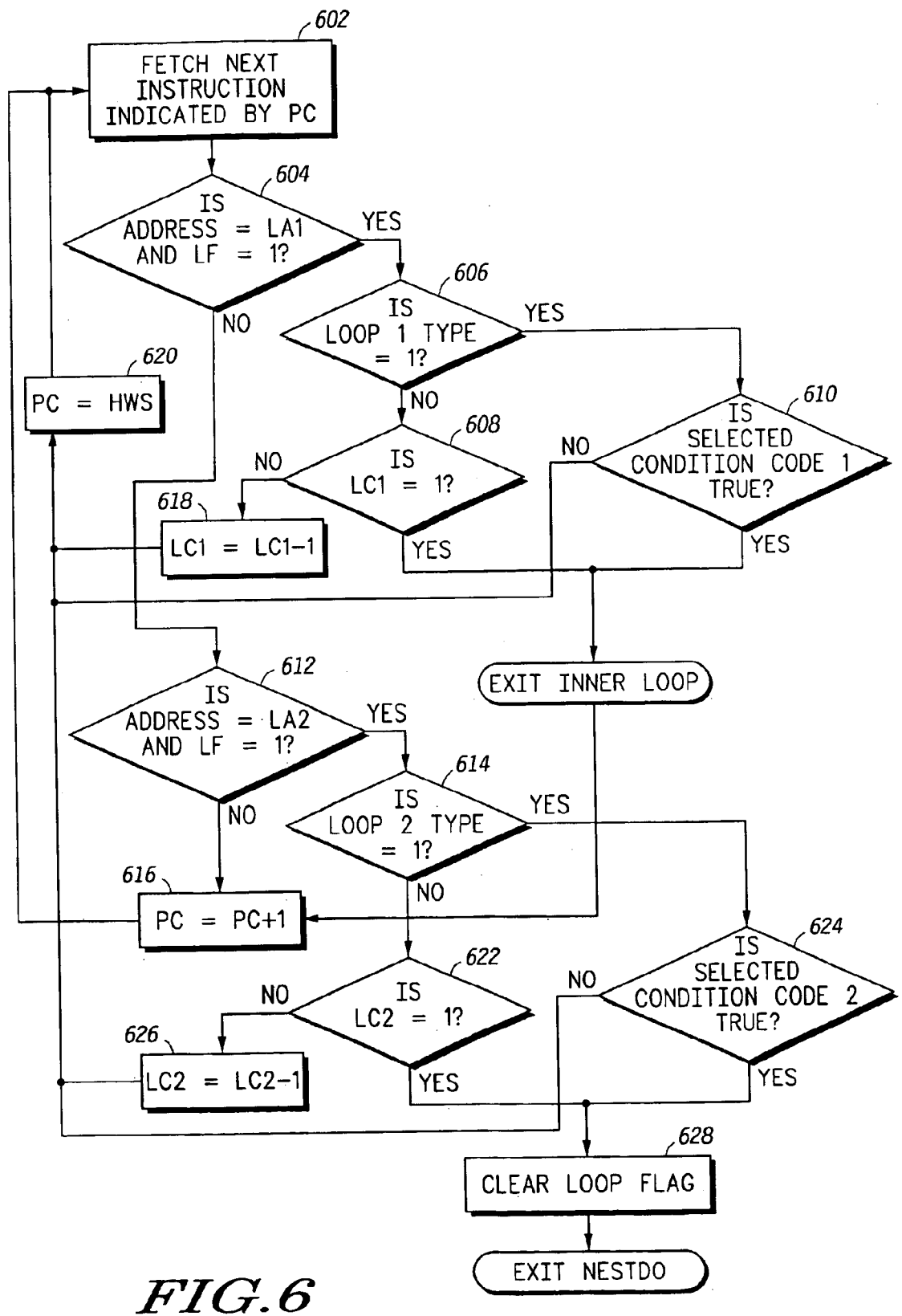
FIG. 6 is a flow diagram illustrating processing of the instructions within the loop initialized in FIG. 5.

Turning now to FIG. 6, a flow diagram illustrating operation of state machine 350 during processing of multiple loops in a segment of code is presented. Initially, instruction fetch unit 371 of processor 300 retrieves an instruction at the address indicated by the current value of program counter 382. In step 604, the address is compare to the value stored in loop address 1 register 332. If the address is equal to the value of loop address 1 register 332 (and loop flag (LF) 386 is equal to 1), then the end of the inner most loop has been encountered and a decision is made in step 606. If the address of the currently executing instruction is not equal to the value stored in the loop address 1 register 332, the flow diagram proceeds to step 612 in which the address is compared to the value stored in loop address 2 register 334. Returning to step 606 for the case in which the address is equal to loop address 1 register 332, the loop type of the inner most loop is determined by examining a loop 1 type variable, which was initialized when instruction 100 was encountered. In one embodiment of the present invention, the loop 1 type variable may be stored in status register 384 to indicate whether the loop is a conditional or nonconditional type of loop. If the loop 1 type variable indicates that the inner most loop is a conditional loop, a determination is made in step 610 whether the corresponding condition code is true. If the loop 1 type is not a conditional type (i.e., the loop 1 type is an immediate type) a comparison is made in step 608 between the loop count 1 register 336 to determine whether the loop has been executed the specified number of times. If either the loop count or condition code has been satisfied, the inner loop is exited by incrementing the program counter in step 616. If the selected condition code is not true or, in the case of an immediate type loop, the loop counter has not reached the predetermined value, the inner most loop is repeated. In the case of an immediate type loop, the loop counter is decremented in step 618. In either case, the inner most loop is repeated by setting the program counter to the value stored in hardware stack register 362*a* in step 620.

If the address of the currently executing instruction is not equal to loop address 1 register 332, a comparison is made in step 612 between the address of the currently executing instruction and the value of loop address 2 register 334 in step 612. If the address of the currently executing instruction is not equal to the value stored in loop address 2 register 334, then the next instruction is executed and the program counter is simply incremented in step 616. If, on the other hand, the loop address of the currently executing instruction is equal to the value of loop address 2 register 334, then the end of the second most inner loop (which, in this case, is the outer most loop) has been encountered.

In steps 614, 622, and 624 steps analogous to steps 606, 608 and 610 are performed to control the program flow for the second loop. More specifically, the loop type of the second loop is determined by examination of a loop 2 type variable. As above, in one embodiment of the present invention, the loop 2 type variable may be stored in the status register 384. If the loop 2 type variable indicates that the second loop is a conditional loop, the second condition code (stored in second condition code select register 342) is examined in step 624. If the loop 2 type variable indicates that loop 2 is an immediate type loop, loop 2 count variable stored in loop count 2 register 338 is examined in step 622. If either the loop count comparison in step 622 or the condition code comparison in step 624 reveals that the appropriate condition has been reached, then the loop flag is cleared in step 628 and the loop is exited. If, on the other hand, the selected condition code 2 is not true or the loop count 2 variable is not equal to 1, program control is returned to the top of the loop by setting the program counter to the value in hardware stack register 362*b* in step 620. In the case of an immediate type loop, the loop count 2 variable is decremented in step 626 before returning program flow to the instruction indicated by the value stored in hardware stack register 362*b*.

Note also that in alternate embodiments, the NESTDO instruction (or like instruction), may be located in a variety of different locations. For example, it can be located at the beginning of a loop, end of a loop, or any other appropriate location.

Turning now to FIG. 7, a program code segment is illustrated for purposes for emphasizing an embodiment of the invention in which a single loop is utilized in conjunction with multiple termination conditions. In the depicted embodiment, the NESTDO statement 700 includes two termination conditions and an address label. When the program execution flow reaches the address label, both of the termination conditions are evaluated to determine whether the program flow should execute the loop again or exit the loop entirely. In the depicted example, the first termination condition 702 is a conditional code of "equal" while a second termination condition 704 is an immediate type code. In this example, when the program flow reaches the address indicated by the address label LBL, the condition code (which has been set by the last instruction in the loop) and the immediate value are both evaluated. If either the condition code or the immediate value indicate that the loop should be terminated, then the do loop is exited. In this manner, one embodiment of the present invention contemplates a single do statement with multiple termination conditions. Alternate embodiments may involve a logical combining of two or more termination conditions to determine whether the loop should be terminated. Alternate embodiments may also define only one termination condition.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. Benefits, other advantages, and solutions to problems have been described with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A processor comprising:
   an execution unit to execute a set of instructions; and
   an instruction fetching mechanism that retrieves the set of instructions to be executed by the execution unit, at least one of the set of instructions comprising a single instruction that provides information corresponding to at least two different loops, wherein the at least two different loops have at least one of the different start addresses or different end addresses.

2. The processor of claim 1, wherein the single instruction provides the information to initialize the at least two different loops for later execution.

3. The processor of claim 1, wherein the at least two different loops are implemented in a nested structure.

4. The processor of claim 1, wherein the single instruction includes at least one loop termination condition corresponding to at least one of the at least two different loops.

5. The processor of claim 1, wherein the single instruction includes at least one field that identifies a location of a last instruction of at least one of the at least two different loops.

6. The processor of claim 4, wherein the at least one loop termination condition comprises one of a loop count value or a condition code.

7. The processor of claim 1, wherein the single instruction includes a loop termination condition corresponding to each of the at learn two different loops.

8. The processor of claim 7, wherein each loop termination condition comprises one of a loop count value or a condition code.

9. The processor of claim 1, wherein the single instruction includes fields that identify a location of a last instruction of each of the at least two different loops.

10. A method of performing an instruction for use by a processor, the method comprising:
    fetching a single instruction from a memory source, wherein the single instruction corresponds to multiple looping constructs, the multiple looping constructs including a first loop and a second loop to be executed;
    decoding the single instruction; and
    in response to decoding the single instruction, using information provided by the single instruction to initialize a plurality of loop storage elements corresponding to the first loop and the second loop, wherein the first loop and the second loop have at least one of different start addresses or different end addresses.

11. The method of claim 10, wherein the multiple looping constructs are nested such that the first loop its nested within the second loop.

12. The method of claim 10, wherein the information provided by the single instruction to initialize the plurality of loop storage elements includes at least one termination condition for each of the first loop and the second loop.

13. The method of claim 12, wherein the at least one termination condition for each of the first loop and the second loop comprises at least one of a loop count value and a condition code.

14. The method of claim 12, further comprising:
performing a first set of logic relating to the at least one termination condition for the first loop; and
performing a second set of logic relating to the at least one termination condition for the second loop.

15. The method of claim 12 further comprising:
determining a loop type for each of the first loop and the second loop, wherein the loop type is selected from one of a conditional and non-conditional type;
if the loop type is conditional, the termination condition comprises a condition code; and
if the loop type is non-conditional, the termination condition comprises a loop count value.

16. The method of claim 13, wherein the information provided by the single instruction to initialize the plurality of loop storage elements includes an end of loop address for each of the first loop and the second loop.

17. The method of claim 13, wherein the information provided by the single instruction to initialize the plurality or loop storage elements includes a start of loop address for each of the first loop and the second loop.

18. The method of claim 10, wherein the information provided by the single instruction to initialize the plurality of loop storage elements includes an end of loop address for each of the first loop and the second loop.

19. The method of claim 10, wherein the single instruction is a first instruction of the first loop and a first instruction of the second loop, the first instruction of the first loop and the first instruction of the second loop being a same instruction at a same instruction address.

20. The method of claim 19, wherein the single instruction is one of a beginning instruction of the first and second loops and an ending instruction of the first and second loop.

21. method of claim 10, further comprising:
determining a loop type corresponding to the single instruction, wherein the loop type is selected from one of a conditional and non-conditional type.

* * * * *

UNITED STATES PATENT AND TRADEMARK OFFICE
CERTIFICATE OF CORRECTION

PATENT NO. : 6,842,895 B2  
APPLICATION NO. : 09/746978  
DATED : January 11, 2005  
INVENTOR(S) : Pascal Renard Page 1 of 1

It is certified that error appears in the above-identified patent and that said Letters Patent is hereby corrected as shown below:

In Column 8, Line 30, Claim No. 1:

Change "loops have at least one of the different" to --loops have at least one of different--

In Column 8, Line 48, Claim No. 7:

Change "of the at learn two different loops." to --of the at least two different loops--

In Column 10, Line 21, Claim No. 21:

Change "method of claim 10, further comprising:" to --A method of claim 10, further comprising:--

Signed and Sealed this

Tenth Day of June, 2008

JON W. DUDAS  
*Director of the United States Patent and Trademark Office*